May 6, 1924.

W. H. CRAMER

POULTRY COOP

Filed July 10, 1922

1,493,323

2 Sheets-Sheet 1

W. H. Cramer
INVENTOR

BY Victor J. Evans
ATTORNEY

WITNESS:

May 6, 1924.

W. H. CRAMER

POULTRY COOP

Filed July 10, 1922    2 Sheets-Sheet 2

1,493,323

W. H. Cramer
INVENTOR

BY Victor J. Evans
ATTORNEY

WITNESS:

UNITED STATES PATENT OFFICE.

WILLIAM H. CRAMER, OF GARNETT, KANSAS.

POULTRY COOP.

Application filed July 10, 1922. Serial No. 573,782.

*To all whom it may concern:*

Be it known that I, WILLIAM H. CRAMER, a citizen of the United States, residing at Garnett, in the county of Anderson and State of Kansas, have invented new and useful Improvements in Poultry Coops, of which the following is a specification.

This invention relates to a poultry coop, the general object of the invention being to provide a coop of great strength and one which is not liable to collapse when other coops or objects are placed upon it.

Another object of the invention is to so construct the coop that it can be manufactured to sell at low cost and which will give the maximum amount of service.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1:
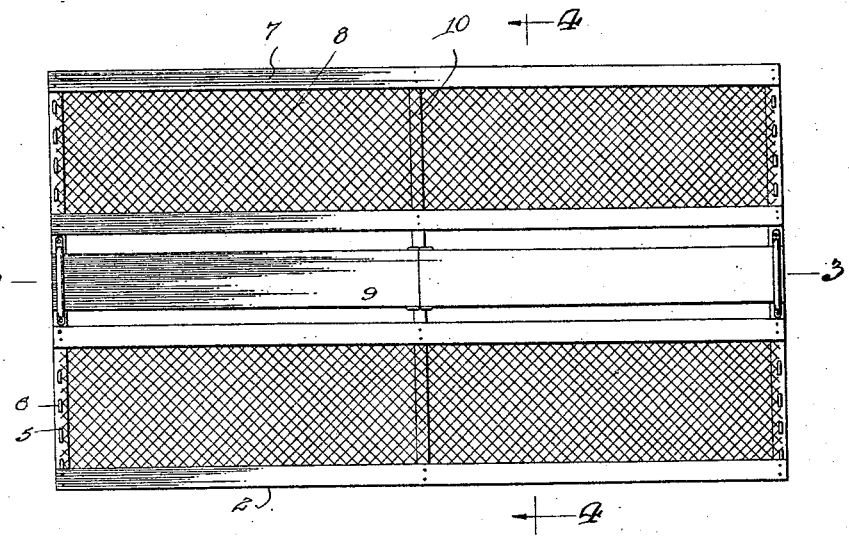
Figure 2:
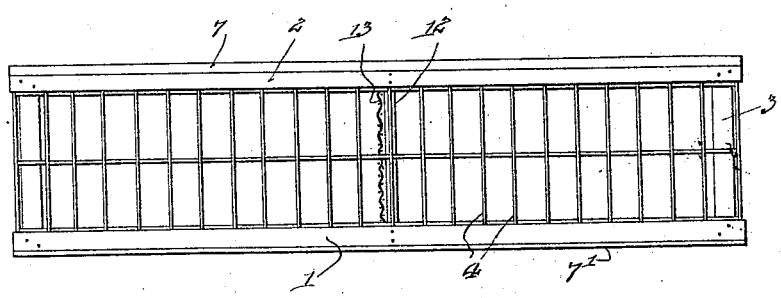
Figure 3:
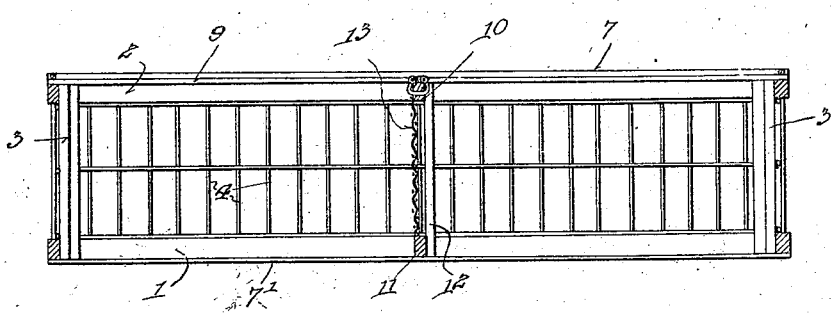
Figure 4:
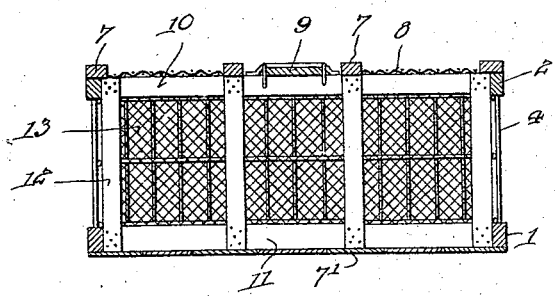
Figure 5:
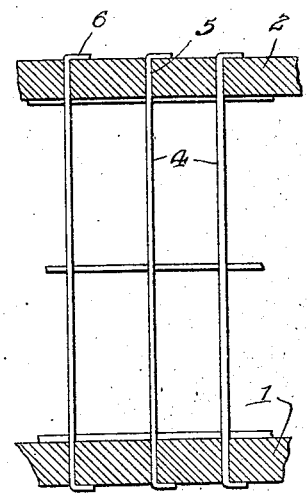

Figure 1 is a plan view.
Figure 2 is a side view.
Figure 3 is a section on line 3—3 of Figure 1.
Figure 4 is a transverse sectional view.
Figure 5 is a detail view showing the wire arrangement with respect to the top and bottom pieces of the coop.

In these views 1 indicates the sides of the coop which are composed of the top and bottom pieces 2 and the upright pieces 3 and the vertical wires 4 which have their ends passing through holes 5 formed in the pieces 2, the ends being bent over upon the pieces, as shown at 6, so as to bind the parts together. These wires 4 are welded or otherwise connected to the horizontal wires 6'. The bottom boards 7' are secured to the lower pieces 2 and the top is composed of the slats 7, which are secured to the top pieces 2, the wire mesh 8 and the boards 9 which form the doors for the coop as shown in Figure 1 of the drawings. These boards are located between the two inner slats 7. I prefer to divide the coop into two chambers by means of the partition 10 which is formed of the cross pieces 11, the posts 12 and the wire mesh 13. One of these posts 12 is placed under each of the slats 7. As shown one of the horizontal wires 6 rests against the inner edge of each of the pieces 2 so that the pieces 2 are firmly held together and cannot be pulled apart or pressed together as the vertical wires act as posts and their bent ends prevent the pieces 2 from being pulled off the wires and the horizontal wires prevent the cross pieces being pressed together. It will be seen that the coop has great strength and will not collapse under the weight of other coops or articles placed upon it.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A coop of the class described comprising sides, each formed of wire, top, lower pieces and corner pieces, the top and bottom pieces having holes therein for receiving the ends of the wires, bottom boards secured to the lower pieces, spaced slats secured to the upper pieces for forming a top securing means, wire mesh connected with the slats, a partition dividing the coop into two parts, said partition including posts which are arranged under the slats and doors forming a part of the top and having their inner ends associated with said partition.

In testimony whereof I affix my signature.

WILLIAM H. CRAMER.